Patented May 9, 1950

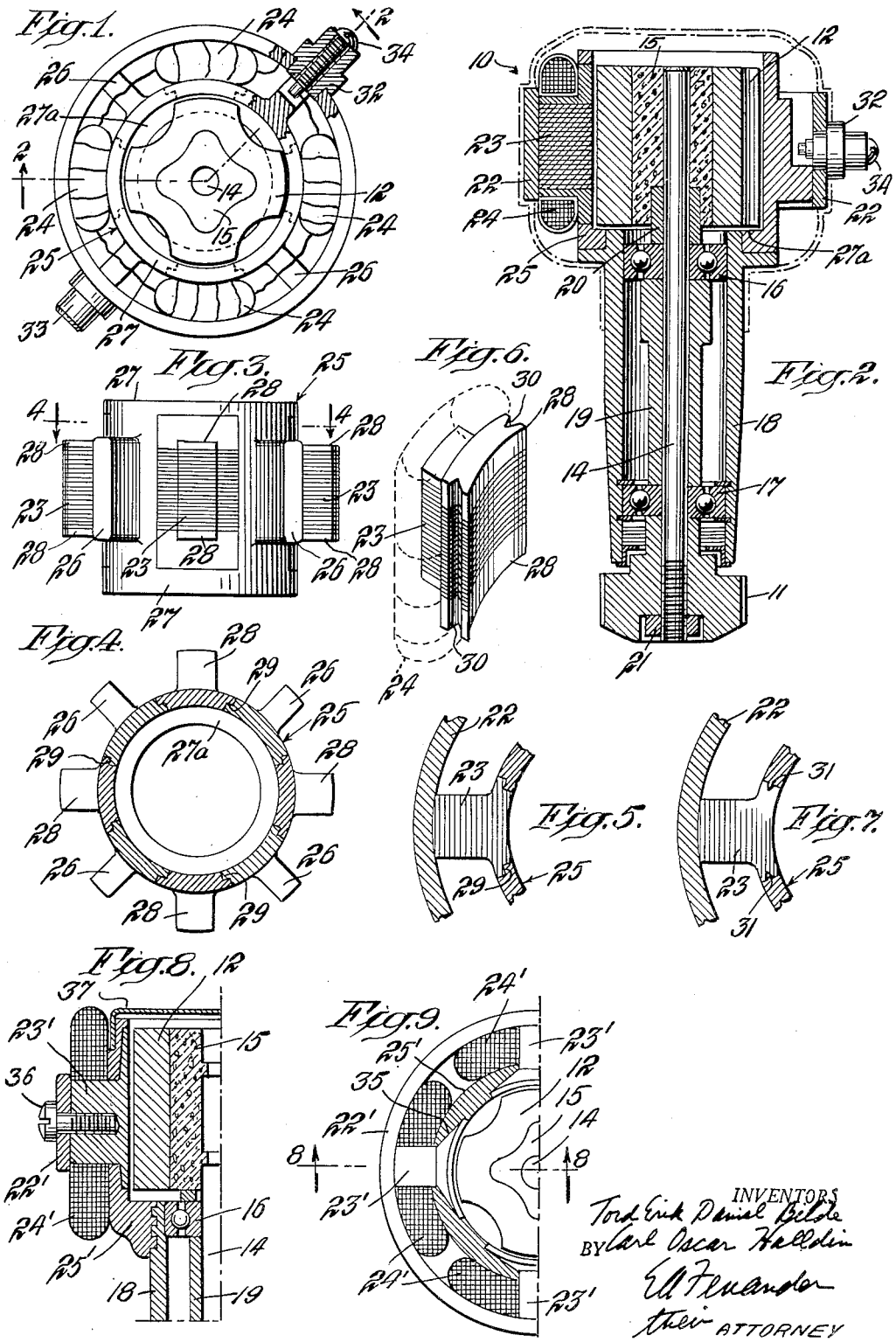
May 9, 1950  T. E. D. BILDE ET AL  2,506,629
DYNAMOELECTRIC MACHINE STRUCTURE
Filed Aug. 6, 1947

2,506,629

UNITED STATES PATENT OFFICE 2,506,629

DYNAMOELECTRIC MACHINE STRUCTURE

Tord Erik Daniel Bilde and Carl Oscar Halldin, Stockholm, Sweden, assignors to Aktiebolaget Elektrolux, Stockholm, Sweden, a corporation of Sweden Application August 6, 1947, Serial No. 766,746 In Sweden December 16, 1943

Section 1, Public Law 690, August 8, 1946 Patent expires December 16, 1963

14 Claims. (Cl. 171—209)

Our invention relates to dynamo-electric machines, and is especially concerned with such machines of small size.

An object of our invention is to provide an improved dynamo-electric machine of simplified construction which can be readily assembled.

Another object of our invention is to provide a dynamo-electric machine having a stationary member construction in such manner that the windings are easily applied thereto.

A further object of our invention is to provide a dynamo-electric machine having a stationary member including windings and a magnet frame constructed in such manner that unintended removal of the windings is made difficult.

According to our invention, we provide a dynamo-electric machine having a stationary member including an inner frame within which a rotatable member is adapted to rotate, and about which the field structure is disposed and extends radially outward therefrom. More specifically, the inner frame comprises a sleeve-like member formed of non-magnetizable or non-magnetic material, and field poles extending radially outward therefrom. The field poles include pole pieces over the outer ends of which the windings can be readily slipped and mounted in position. A magnet frame is disposed about the field poles and bears against the outer ends thereof, the arrangement preferably being such that the magnet frame is resiliently held against the pole pieces or fixed in position in any other comparable manner to make it difficult to tamper with the magnet frame and gain unintended access to the windings.

The invention, together with the above and other objects and advantages thereof, will become apparent as the following description proceeds, and the features of novelty which characterize our invention will be pointed out with particularity in the claims annexed to and forming a part of this specification.

In the drawing, Fig. 1 is an end view, partly in section, of a dynamo-electric machine embodying our invention; Fig. 2 is a sectional view taken on line 2—2 of Fig. 1; Fig. 3 is an elevation view of part of the construction shown in Fig. 2; Fig. 4 is a view taken on line 4—4 of Fig. 3; Fig. 5 is a fragmentary sectional view of part of the construction shown in Fig. 2; Fig. 6 is a perspective view illustrating a modified construction for certain parts of Fig. 2; Fig. 7 is a fragmentary sectional view similar to Fig. 5 of parts of the modified construction for a machine like that shown in Fig. 2; Fig. 8 is a fragmentary sectional view, taken on line 8—8 of Fig. 9 illustrating another modification of the invention; and Fig. 9 is a fragmentary end view, partly in section, of the machine shown in Fig. 8.

Although not to be limited thereto, we have shown our invention applied to a dynamo-electric machine 10 of small size suitable for operation as a lighting generator on a bicycle or other similar vehicle, and arranged to be driven with the aid of a wheel 11. When mounted on a bicycle, the wheel 11 is adapted to frictionally engage a moving part, such as, for example, a tire of the bicycle.

The rotatable member includes a line magnetized permanent magnet 12 which is fixed to a shaft 14 by a body 15 of suitable material, as by casting, for example. The portion of the shaft 14 extending from the magnet 12 is journaled in bearings 16 and 17 secured in a tubular member 18, a spacer sleeve 19 being provided on the shaft between the bearings. Another spacer sleeve 20 held in the body 15 acts against the upper bearing 16, while the driving wheel 11, which is fixed to the shaft 14 and retained thereon by a nut 21, acts against the lower bearing 17. The stationary member, about which may be provided a suitable housing, as indicated by dotted lines in Fig. 2, includes an external field ring or magnet frame 22, and field poles comprising laminated pole pieces 23 provided with windings 24.

In accordance with our invention, the stationary member is so constructed that the pole pieces 23 are disposed about and extend radially outward from an inner frame or annular member 25 within which the rotatable member is adapted to rotate. We do this by providing an inner frame 25 which is ring-shaped and formed with apertures at which regions the pole pieces 23 are fixed thereto, and radially extending arms or legs 26 therebetween. Referring to Fig. 3, the inner frame 25 essentially forms a cage having end collars or rings 27 connected by bars or strips from which regions the legs or arms 26 extend radially outward. The lower collar 27 is internally flanged at 27a and fixed to the tubular member 18 in any suitable manner, as by a threaded connection like that shown in Fig. 8, for example.

As best shown in Fig. 6, each pole piece 23 may comprise a stack of sheet metal laminations held together in any suitable manner between end plates 28 which may be formed of ferrous metal or aluminum, for example. In the embodiment illustrated in Figs. 1 to 5, the pole pieces are provided with shoulders 29, which fit into similar shaped recesses at the edges of the apertures in the frame 25, to limit the extent of inward movement of the pole pieces and maintain the inner surfaces thereof substantially flush with the inner wall of the frame 25. The magnet frame or external field ring 22 fits snugly over the pole pieces 23 and serves to hold the windings 24 in position.

Figs. 6 and 7 illustrate a modified form of construction which differs from the embodiment just described in that the pole pieces 23 are formed with V-shaped grooves 30 which receive similar shaped tongues 31 formed at the peripheral edges of the apertures in the frame 25. In this way the pole pieces 23 are rigidly secured to the frame 25 and cannot be moved radially in either direction.

We make the stationary member by forming the inner frame 25 of non-magnetizable material, such as, for example, a thermo-plastic substance which can be readily molded under either or both heat or pressure. Among the substances which can be employed may be mentioned materials containing artificial resins and ceramic compositions. When the frame 25 is shaped by molding, the pole pieces 23 may be mounted thereon during the molding operation, this being especially suitable for the form of construction shown in Figs. 6 and 7 in which the pole pieces are formed with V-shaped grooves 30.

After the pre-formed coils or windings 24 are slipped over the outer ends of the pole pieces 23, the magnet frame 22 is detachably secured in position. In order to prevent unintended removal of the windings, the magnet frame 22 may be pressure fitted about the ends of the pole pieces so that the frame 22 will bear resiliently against the pole pieces 23. This may be accomplished by pressing or crimping the magnet frame over the outer ends of the pole pieces 23.

In the embodiment of the invention just described, in which the dynamo-electric machine is employed as a lighting generator, the magnet frame 22 is provided with pins 32 and 33 to facilitate mounting the machine on a vehicle. A connecting screw 34 passes through the pin 32 to which one terminal of windings 24 and a conductor of the lighting circuit are connected. The opposite terminal of the windings 24 is connected to the magnet frame 22 which in turn is grounded to the frame of the vehicle.

In Figs. 8 and 9 we have illustrated another form of the invention which differs from the first described embodiment in that the pole pieces 23', which are shown as being of an unlaminated type, are inserted into position from the interior of the frame 25'. The frame 25' at its inner surface is formed with recesses 35 which receive the wider inner portions of the pole pieces 23', so that the latter will be flush with the inner surface of the frame 25'.

The windings 24' are positioned over the radially extending portions of the pole pieces 23' and maintained thereon by the magnet frame 22'. Screws 36 are provided about the magnet frame 22' to draw the outer ends of the pole pieces 23' tightly against the inner surface of such frame, thereby bringing the inner wider portions of the pole pieces 23' snugly in position in the recesses 35. The frame 25' is formed to receive an end plate 37 which serves to enclose the rotatable member of the machine, the windings 24', outer portions of the pole pieces 23' and magnet frame 22' being disposed exteriorly of such enclosure.

In view of the foregoing, it will now be understood that we have provided an improved dynamo-electric machine in which the windings are easily mounted on a stationary member, especially in a machine of small size. In the embodiments of the invention illustrated and described, the rotatable member of the machine may be partly or entirely disposed within the non-magnetizable sleeve about which the laminated stator structure is disposed. In many instances it is not necessary to provide a housing or casing for the dynamo-electric machine of the invention. Hence, a simple construction is obtained in which the windings are not only easily positioned on the pole pieces but are also effectively retained in position by the magnet frame or similar bridge member. This produces an inexpensive and easily manufactured construction.

Modifications of the embodiments of our invention which we have described will occur to those skilled in the art, so that we desire our invention not to be limited to the particular arrangements set forth. For example, the rotatable member of the dynamo-electric machine may comprise a laminated core structure provided with windings. Therefore, we intend in the claims to cover all those modifications which do not depart from the spirit and scope of our invention.

What is claimed is:

1. In a dynamo-electric machine having a rotatable member, a stationary member including a non-magnetic sleeve which is annular in form and within which the rotatable member is adapted to rotate, field structure disposed about said non-magnetic sleeve comprising a number of field poles in spaced apart relation which extend radially outward from said sleeve and are fixed to the latter at their inner ends, and a field winding comprising pre-formed coils for said field poles adapted to be positioned on said poles at the outer ends thereof after said poles are fixed in position on said non-magnetic sleeve.

2. In a dynamo-electric machine having a rotatable member, a stationary member including a non-magnetic hollow sleeve which is annular in form and within which said member is adapted to rotate, field structure disposed about said non-magnetic sleeve comprising a number of field poles in spaced apart relation which extend radially outward from said non-magnetic sleeve, said sleeve having apertures at which regions the inner ends of said poles are disposed and openly face the rotatable member, and a field winding comprising pre-formed coils for said field poles.

3. A dynamo-electric machine having a stationary member including an annular sleeve formed with apertures, and detachable pole pieces having first portions bearing against the inner surface of said sleeve about the apertures and second portions having a smaller cross-sectional area than the first portions and extending radially outward through the apertures in said sleeve.

4. A dynamo-electric machine as set forth in claim 3 in which the inner surface of said sleeve is formed with recesses to receive the first portions of said pole pieces whereby the latter are flush with such inner surface.

5. A dynamo-electric machine as set forth in claim 3 including a bridge member encircling said pole pieces, and means for drawing the outer ends of said pole pieces toward said bridge member whereby the first portions thereof are held tightly against the inner surface of said sleeve.

6. A dynamo-electric machine as set forth in claim 5 in which said sleeve is non-magnetic and said bridge member serves as an outer magnet frame.

7. A dynamo-electric machine having a stationary part including structure providing a non-magnetic member which is annular in form and within which at least a part of the rotatable part of the machine is adapted to rotate, field poles formed entirely of magnetic material, each of said field poles being independently mounted on said non-magnetic member and extending radially outward therefrom, and a field winding comprising a pre-formed coil positioned on each of said field poles, said field poles contacting said non-magnetic member only at the inner ends thereof and said coils in their entirety being disposed exteriorly of said non-magnetic member and said coils being insertable on and removable from said field poles without affecting the relative position of said field poles and said non-magnetic sleeve.

8. A dynamo-electric machine having a stationary part including structure providing a non-magnetic member within which at least a portion of the rotatable part of the machine is adapted to rotate, field poles of magnetic material individually mounted on said non-magnetic member and extending radially outward therefrom, said field poles engaging said non-magnetic member only at the inner ends thereof and otherwise being out of contact therewith, the inner faces of said field poles unobstructedly facing the rotatable part of the machine, and a field winding comprising a coil on each of said field poles adapted to be mounted thereon over the outer ends of said poles.

9. A dynamo-electric machine having a stationary part including structure providing a non-magnetic sleeve within which the rotatable part of the machine is adapted to rotate, field poles of magnetic material mounted on said non-magnetic sleeve and extending radially outward therefrom, said field poles contacting said non-magnetic sleeve only at the inner ends thereof, a detachable outer magnet frame spaced from said non-magnetic sleeve for mechanically and magnetically connecting the outer ends of said field poles, and a winding on each of said field poles, said windings in their entirety being disposed in the gap between said non-magnetic sleeve and said outer frame.

10. A dynamo-electric machine having stationary structure including a member providing a non-magnetic sleeve of annular form having spaced apart apertures about the periphery thereof, field poles of magnetic material having the inner ends thereof arranged at the apertures and extending radially outward from said non-magnetic sleeve, said non-magnetic sleeve and inner ends of said field poles presenting a substantially imperforate wall within which the rotatable member of the machine is adapted to rotate, and a winding mounted on each of said field poles, said field poles contacting said non-magnetic sleeve only at the inner ends thereof and said windings in their entirety being disposed exteriorly of said non-magnetic sleeve.

11. A dynamo-electric machine having stationary structure including a member providing a non-magnetic sleeve of annular form having spaced apart apertures about the periphery thereof, said non-magnetic sleeve presenting a substantially imperforate wall except for the apertures within which the rotatable member of the machine is adapted to rotate, field poles of magnetic material having the inner ends thereof arranged at the apertures and extending radially outward from said non-magnetic sleeve, a winding mounted on each field pole, and a detachable outer magnet frame extending about said field poles for mechanically and magnetically connecting the latter, said windings in their entirety being disposed between said non-magnetic sleeve and said outer frame.

12. A dynamo-electric machine having a stationary part including a generally cylindrical-shaped member of non-magnetic material, a plurality of field poles comprising independent stacks of sheet metal laminations of magnetic material having the inner ends of greater cross-sectional area than the outer ends thereof, said field poles being individually mounted on said cylindrical-shaped member and extending radially outward therefrom, said field poles engaging said cylindrical-shaped member only at the inner ends thereof and otherwise being out of contact therewith, windings on said field poles, and a removably connected outer magnet frame extending about said field poles and firmly held against the outer ends of said poles, said windings being positioned between said outer frame and cylindrical-shaped member and disposed exteriorly of the latter in their entirety.

13. A dynamo-electric machine having a stationary part including a non-magnetic member of annular form within which the rotatable part of the machine is adapted to extend lengthwise thereof, a plurality of individual field poles removably mounted on said non-magnetic member and extending radially outward therefrom, said field poles only engaging said non-magnetic member at the inner ends thereof, a winding on each field pole adapted to be positioned over the outer end thereof, and a detachable outer magnet frame extending about said field poles and firmly held against the outer ends of said poles, said windings being positioned between said outer frame and non-magnetic annular member and disposed exteriorly of the latter in their entirety.

14. A dynamo-electric machine having a stationary part including a non-magnetic member of annular form within which the rotatable part of the machine is adapted to extend lengthwise thereof, field poles permanently mounted on said annular member to form a composite structure therewith and extending radially outward therefrom, said field poles only engaging said annular member at the inner ends thereof, a winding on each field pole adapted to be positioned over the outer end thereof, and a detachable outer magnet frame for mechanically and magnetically connecting the outer ends of said field poles, said windings being positioned between said outer frame and non-magnetic annular member and disposed exteriorly of the latter in their entirety.

TORD ERIK DANIEL BILDE.
CARL OSCAR HALLDIN.

REFERENCES CITED

The following references are of record in the file of this patent:

UNITED STATES PATENTS

| Number | Name | Date |
|---|---|---|
| 1,031,316 | Apple | July 2, 1912 |
| 1,440,952 | Apple | Jan. 2, 1923 |
| 1,722,284 | Fisher | July 30, 1929 |
| 1,897,068 | Morton | Feb. 14, 1933 |
| 1,974,183 | Gunderson | Sept. 18, 1934 |
| 2,187,033 | Hubacker | Jan. 16, 1940 |
| 2,240,652 | Jenkins | May 6, 1941 |
| 2,283,763 | Roglin | May 19, 1942 |
| 2,323,114 | Bradford | June 29, 1943 |
| 2,460,418 | Hart | Feb. 1, 1949 |

FOREIGN PATENTS

| Number | Country | Date |
|---|---|---|
| 494,601 | Great Britain | Oct. 28, 1938 |